W. C. BARKER.

Buckets for Chain-Pumps.

No. 5,878 Reissued May 19, 1874.

Witnesses

R. Griffin Jr.

Jno. D. Patten

Inventor

W. C. Barker by J. J. Greenough

AM. PHOTO-LITHOGRAPHIC CO. N. Y. (OSBORNE'S PROCESS)

UNITED STATES PATENT OFFICE.

WILLIAM C. BARKER, OF MILLPORT, NEW YORK.

IMPROVEMENT IN BUCKETS FOR CHAIN-PUMPS.

Specification forming part of Letters Patent No. 116,138, dated June 20, 1871; reissue No. 5,878, dated May 19, 1874; application filed October 25, 1873.

*To all whom it may concern:*

Be it known that I, WILLIAM C. BARKER, now residing in Millport, New York, have invented an Improved Bucket for Chain-Pumps, of which the following is a specification:

My invention relates to certain improvements in the buckets of chain-pumps by which I attain to greater cheapness in construction with the maximum of durability, security, and ease in working, and with a vent that will leak the water off from the pump-tube down to the source of supply when the pump is not in use, thereby preventing any liability or danger of its freezing up in cold weather, by which I have been enabled to make an easy-working, durable, and efficient chain-pump that will raise a greater amount of water to any desired height with less power than any pump with which I am acquainted, and cheaper in price.

Figure 1:
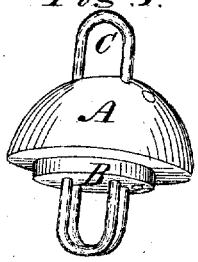
Figure 2:
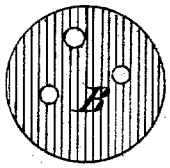
Figure 3:
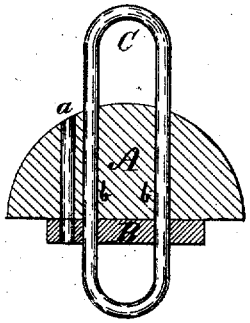

In the drawing the following figures are represented: Figure 1, a perspective view of my bucket; Fig. 2, a plan of the button upon which the bucket rests; Fig. 3, a vertical section of the bucket, full size.

The construction is as follows: I form my bucket A of india-rubber or any other similarly-elastic material, making it convex or contracted from its base up, the purpose being to have an elastic edge or bearing at the base that forms a water-tight joint with the bore of the pump, or nearly so, that can readily be drawn up, and will resist moving downward. This bucket A has a metal loop or link, C, pass through it, to which the chain connecting the buckets is attached above and below the bucket, while a button or washer, B, affixed to the link C, supports the base of the bucket at the center, but does not extend out near the edge, which is thus left free to yield to the pressure of the tube. The apertures through which the link passes are represented at *b b*. The convex side is above in going up the pump-tube, and in its largest circumference the bucket should be considerably larger than the bore of the pump-tube, its flexibility and elasticity allowing it to be compressed and drawn up through the tube, and if, by any accident, the operator releases his hold of the crank-wheel, over which the chain runs, the bucket will not drop in the tube, but will remain where the accident left it; or, in other words, the shape as shown having its largest circumference at its base, readily allows it to be drawn upward through the tube, and resists its being drawn or forced downward by the weight of the water above it. There is a small aperture, *a*, in the bucket that forms a communication between the space in the tube above the bucket and that below, so as to allow the water in the space above to gradually leak down through when the bucket is stationary, for the purpose hereinbefore mentioned.

What I claim, and desire to secure by Letters Patent, is—

1. The semi-spherical elastic bucket A, provided with apertures *a b*, substantially as shown and described.

2. The combination of the bucket provided with an aperture opening between the spaces above and below it in the pump-tube with the washer or button and loop or link, constructed and arranged to operate as set forth.

WILLIAM C. BARKER.

Witnesses:
E. B. JUDD,
E. HALL.